United States Patent

Lemelson

[15] 3,684,150

[45] Aug. 15, 1972

[54] TUBE WELDING APPARATUS

[72] Inventor: Jerome H. Lemelson, 85 Rector St., Metuchen, N.J. 08840

[22] Filed: Feb. 10, 1969

[21] Appl. No.: 801,923

Related U.S. Application Data

[63] Continuation-in-part of Ser. No. 362,870, April 27, 1964, abandoned, which is a continuation-in-part of Ser. No. 44,486, May 18, 1960, abandoned.

[52] U.S. Cl. ................................228/3, 29/470.1
[51] Int. Cl. ..........................B23k 21/00, B23p 3/02
[58] Field of Search ..................29/470.1; 228/3, 1

[56] References Cited

UNITED STATES PATENTS

| | | | |
|---|---|---|---|
| 2,344,939 | 3/1944 | Bennett | 219/101 |
| 2,608,887 | 9/1952 | Sowter | 228/3 |
| 2,822,711 | 2/1958 | Barnes | 81/383.5 X |
| 2,863,344 | 12/1958 | Barnes | 228/3 |
| 2,886,992 | 5/1959 | Barnes et al. | 228/3 |
| 2,909,951 | 10/1959 | Rozmus et al. | 228/3 |
| 2,939,348 | 6/1960 | Barnes et al. | 228/3 |
| 3,058,209 | 10/1962 | Nijhuis et al. | 29/470.1 |
| 3,226,820 | 1/1966 | Anthony et al. | 29/470.1 |
| 2,297,885 | 10/1942 | Graff et al. | 72/318 |

FOREIGN PATENTS OR APPLICATIONS

| | | | |
|---|---|---|---|
| 1,088,170 | 3/1955 | France | 29/470.1 |

Primary Examiner—John F. Campbell
Assistant Examiner—Ronald J. Shore

[57] ABSTRACT

An apparatus and method are provided for butt welding and sealing sections of tubing together. The apparatus includes welding dies which circumscribe the tubing and operate against abutting flanges or flared end portions of aligned tubes to effect a circumscribing weld between the abutting tube flanges. In one form, power operated means urges the dies towards each other with sufficient force to compress and pressure weld the flanges together. In another form, welding pressure is developed by manual means including levers to provide a sufficient mechanical advantage to weld the flanges together. Auxilliary energy such as ultrasonic energy, resistance electrical energy or other form of energy may be brought into play to cooperate in the welding action.

7 Claims, 9 Drawing Figures

PATENTED AUG 15 1972

*INVENTOR.*
Jerome H. Lemelson

TUBE WELDING APPARATUS

RELATED APPLICATIONS

This is a continuation-in-part of application, Ser. No. 362,870 filed Apr. 27, 1964 and entitled Welding Tool and Method which was a continuation of Ser. No. 44,486 filed May 18, 1960 having as a parent application Ser. No. 519,014 filed June 28, 1955 for Welding Techniques, all now abandoned.

The cold or pressure welding of non-ferrous metals without the application of heat is well established in the art and numerous patents have been issued on methods of cold welding. Tools have been developed for butt welding rods or wires which must be machined or otherwise cleaned of dirt and oxides of the metal prior to welding. Welding is effected by clampingly engaging the end portions of each wire along its longitudinal surface with sufficient force to permit the wires to be held by the engaging means and brought together thereby with sufficient force to cause the metal of one to flow against the metal of the other in a molecular bond or cold pressure weld. It is obvious that such tools may not be used for butt welding tubing together since the walls of the tubing will buckle if clamped with sufficient force to abut the edges for welding and the ends of each tube may buckle when axial forces are supplied as required in pressure welding.

It is a primary object of this invention to provide a new and improved tool for pressure welding thin as well as heavy walled tubing together in a circumscribing seal or weld which is fluid-tight permitting the welded assembly to retain or conduct a fluid without leakage.

Another object is to provide welding dies for cold pressure welding which are separable and are held in alignment by a retainer which is also operable to circumscribe and support part of a work member, and separate actuation means to apply sufficient force to the dies to effect a cold pressure weld.

Other objects and features of the invention will be readily apparent from consideration of the following specification and claims relating to the annexed drawings wherein:

Figures 1, 3, 4:
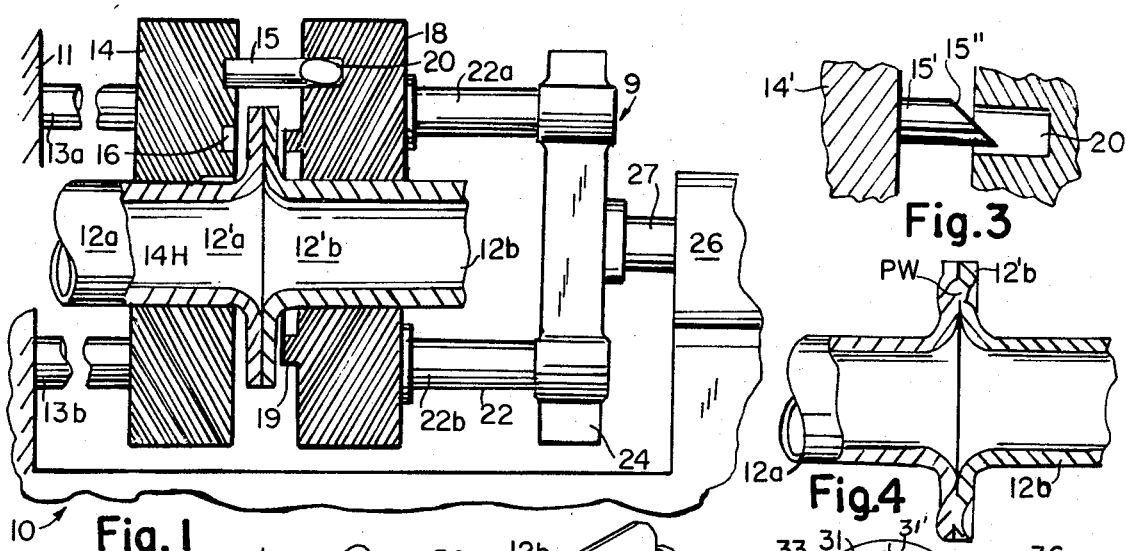
FIG. 1 is a partial sectional view of a machine and die arrangement for pressure welding the flanged ends of metal tubing together.
FIG. 3 is a fragmentary sectioned view of a portion of the apparatus of FIG. 1.
FIG. 4 is a partially sectioned view of tubing showing pressured welded flanges joined by apparatus of this invention.

Referring now to the drawings, there is illustrated in FIGS. 1 to 5 power operated apparatus for effecting a circumscribing weld and seal between the flanges of two sections of tubing or pipe made of pressure weldable material such as aluminum, copper or the like. The apparatus, illustrated in partial section in FIG. 1, comprises a pair of pressure welding dies 14 and 18 one of which, 14, is held stationary and retains one section 12a of the tubing while the other die 18 retains the other section of tubing 12b and is movable by means of a power device 26 to effect a circumscribing weld between the flanges 12a' and 12b' of said tubing sections. The notation 10 refers to a base for the tool for supporting the various components of the tube welding apparatus 9.

The welding tools 14 and 18 are illustrated in FIG. 1 as each being of unitary structure and of annular shape with respective cooperating surface formations for effecting a circumscribing weld PW, as illustrated in FIG. 3, between the flanges of the tubing. The die 14 is provided with an annular groove or channel 16 which cooperates with an annular ridge-like portion 19 protruding from die 18 and in alignment with 16. The movement of die 18 into close proximity with 14 with the flanges of two sections of tubing abutting as in FIG. 1, will cause the material of both flanges to flow together and unite in a circular molecular bond or pressure weld PW as illustrated in FIG. 4, if sufficient force is applied to the die 18. Accordingly the servo 26 is preferably a fluid actuated motor such as a hydraulic or pneumatic cylinder capable of effecting the required application of force to 18.

The sections of tubing are illustrated as being supported by the walls of the respective openings 14H and 18H in the welding dies and are preferably loosely or slidably engageable thereby. The die 14 is shown supported by a plurality of supports or columns 13a and 13b which are supported by the end-wall 11 of the frame or base 10 although 14 may be directly mounted on base 10. The die 18 is secured by means of a plurality of columns 22a and 22b to a frame 24 which is coupled to the fluid ram 26 by means of shaft 27 extending therefrom. The frame 24 is preferably shaped and motor 26 offset to permit tubing section 12b to align with 12a and extend past 26.

Figures 2, 5, 6:
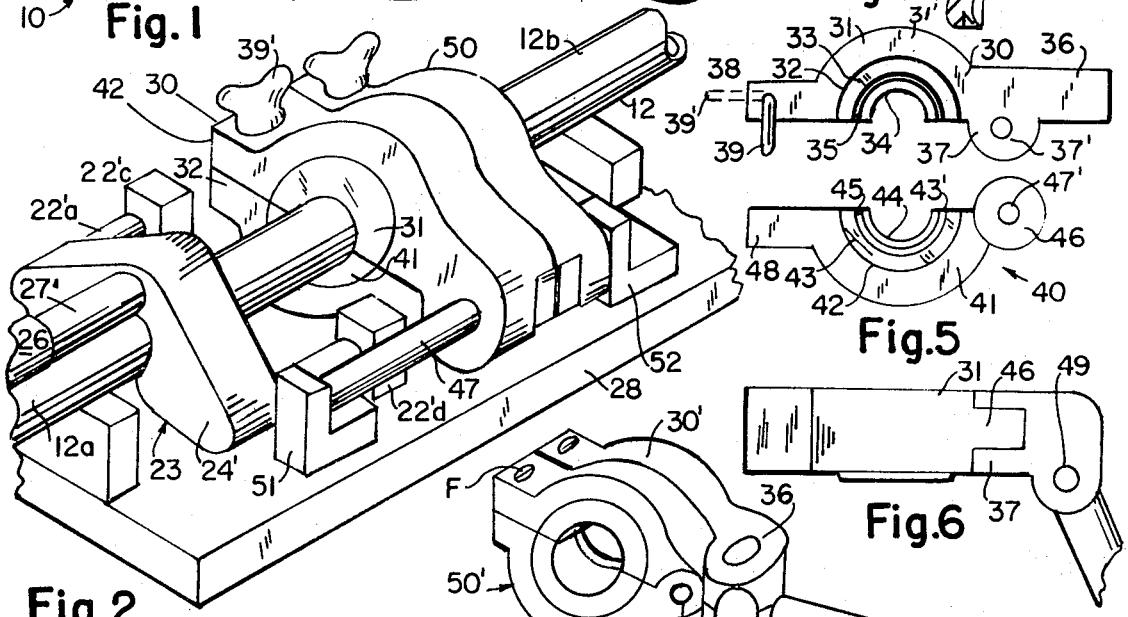
FIG. 2 is an isometric view of a machine for pressure welding pipe or tubing together employing split or openable dies.
FIG. 5 is a side view of a pair of die sections and holders therefore applicable to the apparatus of FIG. 2.
FIG. 6 is a plan view of one of the die sections of FIG. 5.

Further details of a flange welding device of the type illustrated in FIG. 1 are shown in FIG. 2. In the isometric view, FIG. 2, the aforedescribed single piece annular dies 14, 18 have each been replaced by split dies each consisting of die half-sections 31 and 41 which are held by respective die retainers 32 and 42. The pairs of such die assemblies are referred to by the general notations 30 and 50 and function essentially as the dies 14 and 18 of FIG. 1. Both assemblies are supported by means of shaft 47 on which at least 30 is slidably movable. The shaft 47 is supported by brackets 51 and 52 which are secured to and project from the tool base 28. The die half-sections clamp around the respective sections of tubing and are held together to provide respective annular dies by means of the retainers which are pivotally mounted at one end on the shaft 47 and are secured together by means of clamps or fasteners such as the illustrated wing nuts 39' which engage screws secured to the lower die retainers and extend through holes in the end portions of said retainers. The clamping action of the die sections of the assembly 30 against the flanges of the tubing sections 12a and 12b and in cooperation with the die sections of the assembly 50, is effected by means of a hydraulic or pneumatic fluid ram 26 mounting an assembly 23 on the end of its shaft 27' which assembly is shaped to clear the section of tubing 12a and to engage and be disengagable from the face of the die assembly 30. A yoke shaped block 24' is secured to the end of the ram shaft 27' and mounts a pair of column members 22'a and 22'b which extend generally parallel to the axis of shaft 27' and the longitudinal axis of the two aligned tubes to be joined. Metal blocks 22'c and 22'd are secured to the ends of members 22'a and 22'b and are positioned to engage substantial areas of the both portions of the die assemblies.

The deformation of the flanges of both tubing sections as illustrated in FIG. 4, by the coaction of the circular ridge formations 19 and the recess or channel 16 in the other die will result in a circular weld or molecular bond PW which will be fluid tight. When the assembly 23 retracts, the tubing may be removed with the flanges welded together by loosening or removing wing nuts 39' and pivoting the upper die assemblies to permit the die sections to clear the flanges.

The notation 15 refers to a guide pin for retaining the dies in alignment. In FIG. 3, the pin 15 is used to effect the rotation of the dies during the period that molecular welding of the two flanges is effected so as to improve the weld. A slight degree of rotation of one die or die assembly during the latter part of the movement of the dies together when fusion of the metals of both flanges is effected thereby, will eliminate the possibility of there being a parting in the circular weld in the area where the die halves are assembled. The alignment pin 15 is provided with a nose which is tapered at its end 15'' in a manner to engage the wall of the hole 20 into which it is received and to effect the rotational movement of the die assembly 14 in order to effect alignment of the pin in the hole.

It is noted that the die-holders 30 and 50 of FIGS. 1–5 as well as tube loading and ejection apparatus may be servo-motor operated and automatically controlled to provide automatic operation thereof.

Details of a split-die assembly are illustrated in FIG. 5. The die consists of a pair of semi-circular sections 33 and 43 which are secured to respective die holders 30 and 40, by any suitable fastening means. The upper die holder 30 consists of a rear portion 36 which is shaped with a pair of lug portions 37 and a central portion 31 having a semi-circular recess 32 for receiving and positioning the die-half 33. Protruding from the central portion 31 of the holder is a lug portion 38 which is provided with a clamping means for engaging a portion of the lower die holder to retain the die segments together. In FIG. 5, the clamping means comprises a formation of wire or other material in the shape of a loop or ring 39 which is pivotally secured to 38 in a manner to engage the lower surface of the forward end 48 of the lower die retainer 40 and to forcibly retain the two retainers together and the die sections in alignment with each other until the clamp 39 is pivoted to clear 48 as illustrated by the position indicated by the broken lines 39'.

The semi-circular, annular lower die section 43 is received and held in the semi-circular recess 42 of the central portion 41 of the lower die holder in a manner similar to that in which die section 33 is retained by holder 30. A single lug formation 42 projects from the rear end of holder 40 and is provided with a central through and through hole 47' for assembly between the lugs 37 or 30 and with a pin or shaft such as 47 as illustrated in the plan view of FIG. 6. Further details of a similar but modified assembly are also shown in the isometric views of FIGS. 7 and 8. Notations 35, 45 define a welding face similar to 19 of FIG. 1.

Figures 7, 8:
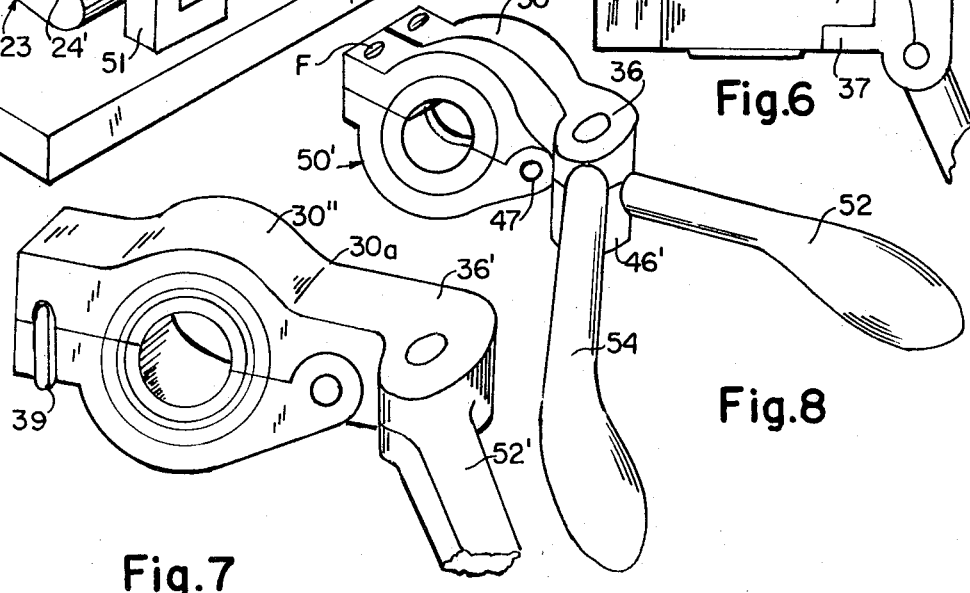
FIG. 7 is an isometric view of a split die assembly applicable to a hand tool and FIG. 8 is an isometric view of a hand tool for welding tubing flanges.

FIG. 8 illustrates a tubing welding tool in the realm of the invention which may be operated by hand. The die assemblies 30' and 50' have each been modified and are mounted to pivot about an axis which is essentially perpendicular to the axis about which the die holder sections pivot. The die holder assemblies 30' and 50' are each provided with respective rearwardly projecting lug portions 36' and 46' which are extensions of the upper die holders of each assembly and serve as retainers for a pin 47 on which said assemblies may be pivoted. Handles 52 and 54 are connected to each of the protruding lug portions. When brought towards each other by hand, the handles pivot the die assemblies to effect movement of the cooperating working surfaces of the dies towards each other.

To use the tool to effect the welding of the flanges of two lengths of tubing, each of the dies assemblies 30' and 50' are separated so that the die sections of each swing clear to receive the ends of the tubing. Screw fasteners F in FIG. 8 are used to retain the die holders together, and these are tightened to secure each die and holder assembly together with the die halves preferably abutting the outer surfaces of the tubing and with the flanges of the tubing abutting each other as illustrated in FIG. 1. The mechanical advantage afforded by the long handles 52 and 54 permits the dies to clampingly engage the exposed faces of both flanges and to cooperate in effecting a circular pressure weld of the type illustrated in FIG. 4.

FIG. 7 shows a modified form of the die assembly of FIG. 8. The upper die-holder 30a of the assembly 30'' is shown having the handle integrally formed with and extending from the lug portion 36'. The means retaining the die holder sections together comprises a clamping ring 39 as taught in FIG. 5.

Numerous other modifications of the present invention will be appreciated by those skilled in the art and accordingly the appended claims should be construed broadly as is consistent with the appended claims and in certain instances some features of the invention will be used without a corresponding use of other features.

Figure 9:
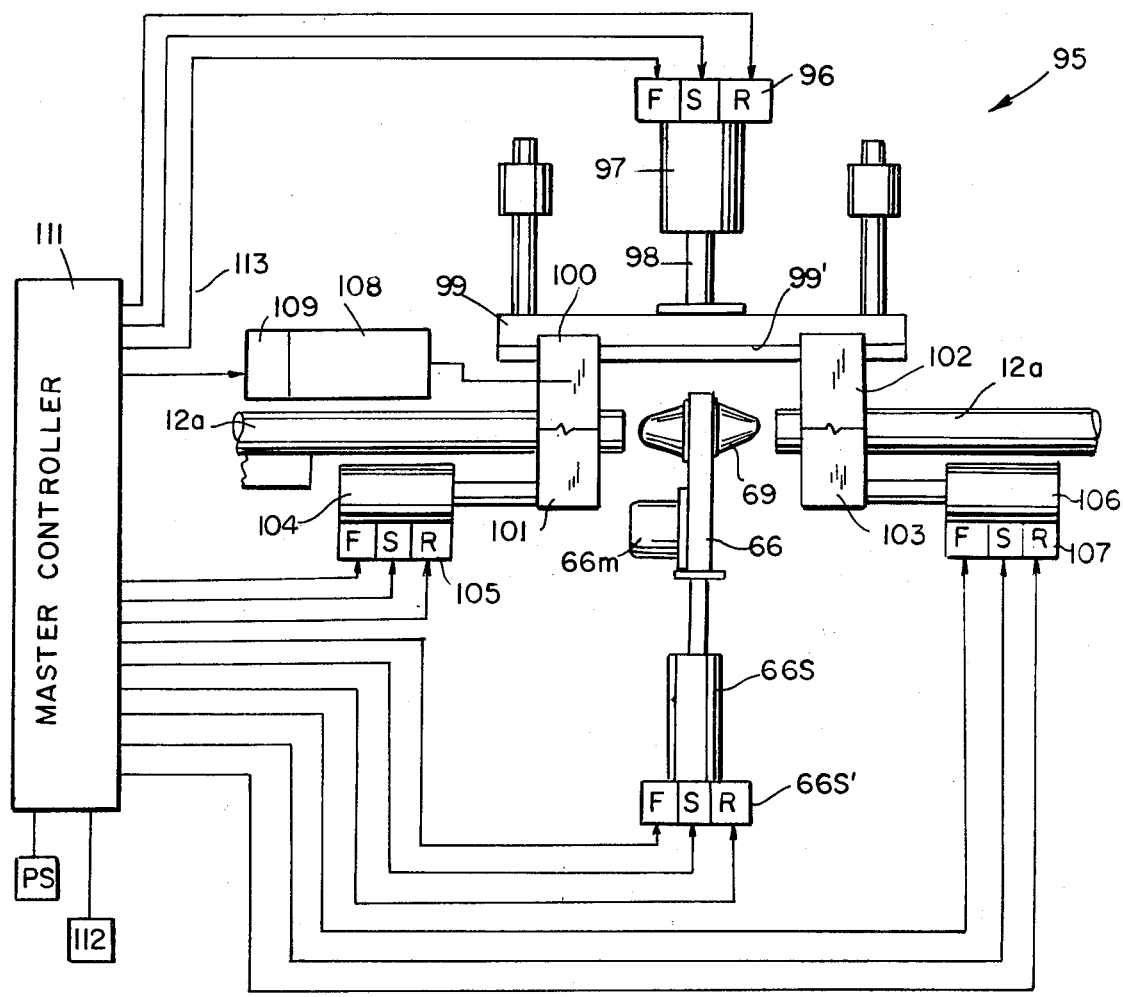
FIG. 9 is a schematic diagram illustrating an automatic control system for the welding and tube flaring apparatus defined herein.

There is shown in FIG. 9 a modified form of the tube welding apparatus shown in FIGS. 1 to 3 which includes means for automatically controlling the described operations. The apparatus 95 of FIG. 9 includes an automatic controller 111 such as a multi-circuit timer or programmed computer which is operative to generate control and/or power signals for controlling power means for clampingly engaging two sections of tube so as to align their ends for welding, power means for abutting the flanged or flared ends of the tubes together and, in those cases where auxilliary power means is utilized for effecting the welding operation, energization of said auxilliary power means at the proper time in the welding cycle to effect welding of the tube ends together. Means for flaring or flanging the ends of the aligned tubes is also provided in FIG. 16 to be automatically operated under the control of the single controller 111 to flare the tube ends in sequence or simultaneously prior to the welding operation.

To describe the apparatus of FIG. 9 a cycle of operation will be described. Upon disposing two tubes 12a and 12b with their end portions in alignment with each other by nesting the tubes in respective holding die halves 101 and 103 using manual or automatic transfer means (not shown) to effect said nesting, a start switch 112 is closed energizing the multi-circuit timer 111 which transmits a first signal on a first of its output lines 113 to the start control F of a lineal actuator 97 causing the output shaft 98 of said actuator to advance a bar 99 which slidably supports the other half sections 100 and 102 of the holding dies which include sections 101 and 103. Advancement of actuator shaft 98 to its fully projected position is operative to cause die sections 100 and 103 to clampingly engage the ends of the respective tubes 12a and 12b to frictionally retain same between the two die assemblies and to secure the die assemblies together so that when the lower die members 101 and 103 are moved thereafter in the act of welding the tube ends together, the upper die members 100 and 102 will slide along a way or track formed in or provided on the end face 99' of bar 99.

If the ends of tubes 12a and 12b have been previously flared or flanged, lineal actuators 104 and 106 as described, may be simultaneously operated by signals generated by controller 111 and transmitted to the start controls F of the controls 105 and 107 of said actuators 104 and 106 so as to advance the output shafts of said actuators and compressively engage the ends of the tubes together to effect welding. If the flared ends of the tubes are to be welded by cold pressure welding, the dies are shaped as described and the actuators 101 and 103 are so operated to effect said described cold pressure welding. If auxiliary power means such as ultrasonic energy, resistance electrical energy or other form of energy is used during abutment of the tube end to effect welding, then a generator 108 of said energy has its controls 109 pulsed or energized at the proper instance by the controller 111 to effect welding.

If the tubes are provided with unflared ends as shown then a flaring tool 66 may be disposed so as to projectable and retractable to dispose its rotating head 69 between the tube ends and to outwardly flare or spin form said tube ends as the actuators 104 and 106 respectively operate to project said tube ends towards each other under the sequential control of the master controller or program timer 111. Accordingly the tool assembly 66 including its rotating flange producing head 69 and the motor drive 66m therefore is coupled to the shaft of a lineal actuator 66S such as an air or hydraulic ram or piston actuator, the controls 66C of which are connected to the master controller 111. When the forward drive control F is energized at the proper instant in a tube flaring and welding cycle, the assembly 66 is projected to dispose the flaring tool head 69 in alignment with the ends of the tubes and when reversed control R of the actuator controller 66S' is activated by a signal transmitted from the master controller 111 after the reverse drive controls R of the controllers 105 and 107 of lineal actuators 104 and 106 have be activated to retract the two tubes to permit the ends thereof to clear the flaring head 69, the flaring tool assembly 66 is retracted to move head 69 out of alignment with the tubes. After the flaring tool 66 has so been retracted, signals from the master controller 111 are generated on the inputs to the controls F of the controllers 105 and 107 for the actuators 104 and 106 to compress the flared tube ends together and to effect the welding of said tube ends together by either pressure alone as described and/or with the expenditure of auxilliary energy such as ultrasonic or resistance electrical energy supplied by the generator 108 when its controller 109 is activated by a signal from the master controller 111. Thereafter the reverse control R forming part of the control means 96 of the actuator 97 is energized to cause actuator 97 to retract die sections 100 and 102 to permit the welded tube assembly to be removed. The forward drive control F actuator 97 is next activated after the tube assembly has been so removed to advance die sections 100 and 102 to engage sections 101 and 103 and the reverse controls R of actuators 104 and 106 are activated to effect retraction of the two die assemblies to the location shown in FIG. 9 whereby the described cycle may be repeated for two other length of tube after the reverse control R of actuator 97 has been energized by the master controller to retract die sections 100 and 102 to permit said new section of tube to be inserted therebetween.

Notations S associated with actuator control units 96, 105, 107 and 66S' refer to stop controls which, when pulsed by signals transmitted thereto from the master controller 111, stop operation of said actuators to predeterminately position their particular assemblies. Such open loop control means may be replaced by closed loop control systems employing feedback signals to precisely control the movement of the various assemblies to effect the desired results.

In the control system illustrated in FIG. 9, it is assumed that the correct power supplies are provided on the correct sides of all controls, motors or actuators, generators, relays and other electrical units provided to effect operation as described. Furthermore, it is noted that the apparatus illustrated in FIG. 9 may be operated without employing the tube end-flaring tool 66 to flare or flange the ends of the tubes prior to welding same together.

I claim:

1. Apparatus for welding the flanged ends of tubing together comprising:
    a first support,
    a first split welding die supported by said first support, said first die having separable portions assembleable around a first flanged end tube and operable for circumscribingly engaging the flanged end of said first tube, means for securing the separable portions of said first die together around said first tube,
    a second support,
    a second split welding die supported by said second support, said second die having separable portions assembleable around a second flanged end tube and operable for circumscribingly engaging the flanged end of said second tube, means for securing the separable portions of said second die together about said second tube, means for predeterminately supporting said first and second supports including guide means for guiding said first support in a path whereby, when said first welding die engages the flanged end of said first tube, said flanged end will be caused to engage The flanged end of said second tube supported by said second support, means for moving said first support towards said second support and means for compressively engaging the flanges of said first and second tubes together between said first and second dies to effect a circumscribing pressure weld between the two abutted flanged ends of said tubes so as to join said first and second tubes together and to provide a fluid-tight seal at the joint defined by said abutted flanged ends.

2. Tube welding apparatus in accordance with claim 11, one of said split welding dies having a welding land circumscribing the tube held thereby and operable to be brought into operative relation with the flange of the tube circumscribed by said die to compressively engage said flange against the flange of the other tube and to effect a circular weld between the two abutted flanged portions of said tube.

3. Tube welding apparatus in accordance with claim 2, said split welding dies being operable to effect a circular cold pressure weld between the materials of the two flanged portions of said tubes by deforming same together and causing an intermingling of the materials of the flanged ends so as to molecularly bond said materials together in a circumscribing weld line.

4. Apparatus for welding the flanged ends of tubing together comprising:
a first support,
a first split welding die supported by said first support, said first die having separable portions assembleable around a first flanged end tube and operable for circumscribingly engaging the flanged end of said first tube, means for securing the separable portions of said first die together about said first tube,
a second support,
a second split welding die supported by said second support, said second die having separable portions assembleable around a second flanged end tube and operable for circumscribingly engaging the flanged end of said second tube, means for securing the separable portions of said second die together about said second tool,
a tool for flaring the ends of said tubes retained between said first and second dies,
means for positioning said tool in alignment with the ends of said first and second tubes and means for operating said tool to outwardly flare the ends of said tubes,
means for predeterminately supporting said first and second supports including guide means for guiding said first support in a path whereby, when said first welding die engages the flared end of said first tube, said flanged end will be caused to engage the flanged end of said second tube supported by said second support,
means for moving said first support towards said second support, and means for compressively engaging the flanges of said first and second tubes together between said first and second dies to effect a circumscribing pressure weld between the two abutted flanged ends of said tubes so as to join said first and second tubes together and to provide a fluid-tight seal at the joint defined by said abutted flanged ends.

5. Tube welding apparatus in accordance with claim 4 including a deforming means having a head operable for deforming the end of a tube, means for relatively moving said head and the aligned ends of said tubes to cause the head to enter and deform both tube ends and to outwardly flare same, and means for relatively moving said head and tube ends after flaring the ends of said tubes to cause said head to clear the ends of said tubes prior to the welding of said tubes together.

6. Tube welding apparatus in accordance with claim 5, said tube deforming head being rotatable against the end walls of said tubes and shaped for spin deforming both tube walls and means for rotating said head as it moves to spin form flanges on the ends of said tubes.

7. Tube welding apparatus in accordance with claim 6 wherein said head is shaped with opposed ends for flaring tubing, said apparatus including means for power driving the two tubes towards each other to simultaneously engage the ends thereof with the shaped opposite ends of said head so as to simultaneously effect the outward flaring of both said tube ends.

* * * * *